April 26, 1955  E. K. MILLS, JR  2,707,084
LAND, SEA AND AIR VEHICLE
Filed July 1, 1954  3 Sheets-Sheet 1

Edward K. Mills, Jr.
INVENTOR.

BY Kenyon & Kenyon
ATTORNEYS.

April 26, 1955     E. K. MILLS, JR     2,707,084
LAND, SEA AND AIR VEHICLE
Filed July 1, 1954     3 Sheets—Sheet 2

EDWARD K. MILLS, JR.
INVENTOR.

BY Kenyon & Kenyon
ATTORNEYS.

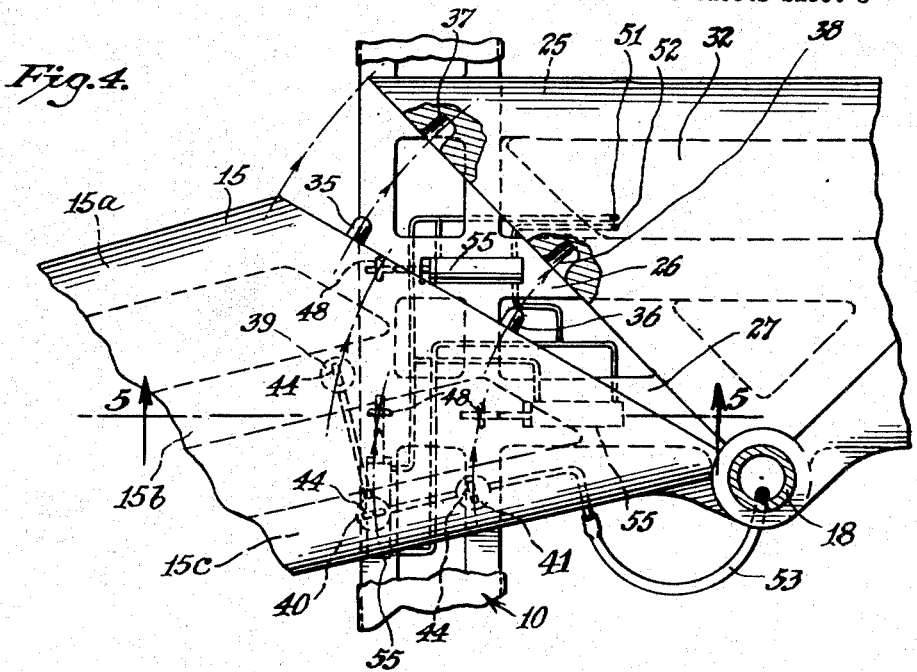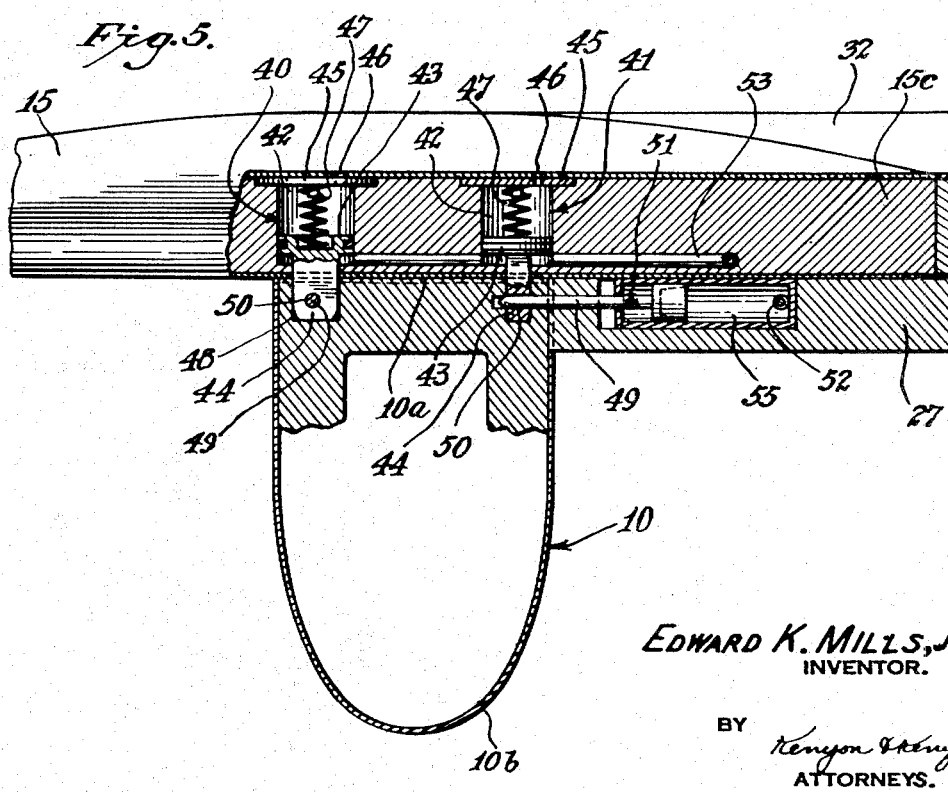

United States Patent Office 2,707,084
Patented Apr. 26, 1955

2,707,084

LAND, SEA, AND AIR VEHICLE

Edward K. Mills, Jr., Morristown, N. J.

Application July 1, 1954, Serial No. 440,764

3 Claims. (Cl. 244—49)

The present invention relates to multi-purpose motored vehicles, and more particularly to a vehicle adapted selectively to function as an airplane, an automobile or truck and as a speedboard or cargo carrier for water use.

Vehicles are known which are convertible for use either as an automobile or airplane. Such vehicles, however, have not been commercially feasible in that their construction and operation generally represent an awkward compromise between optimum requirements for aircraft design and those entailed for an efficient road vehicle. While vehicles of this type are usually provided with means to fold back the wings when road operation is intended, the folded wings in this condition serve no useful structural function. Moreover, such convertible vehicles are limited to land and air operation and are incapable of operating on water.

Accordingly, it is the principal object of this invention to provide a multi-purpose vehicle for military or civilian use adapted to operate selectively as an airplane, a road vehicle and a boat, and wherein the same power unit and controls, without any adjustment, effectively propel and control the vehicle in a selected form of operation.

More specifically it is an object of the invention to provide a vehicle as a preferred form constituted basically as a monoplane having a twin-boom frame structure and a pusher type of propulsion, the propeller rotating between the twin booms. A significant feature of the invention resides in the fact that the wings of the vehicle are arranged to fold tailward over the twin booms to create a road vehicle or truck immediately usable on land. The nature of the booms is such that the same vehicle is also immediately usable on water without further adjustment.

Another object of the invention is to provide a versatile vehicle of the above-described type wherein with the wings in the folded position, the over-all dimension of the vehicle is garage size and comparable to that of a conventional automobile. An additional and important feature of the invention resides in the fact that the folded wings meet to form a substantially flat platform having a large area capable of carrying a heavy cargo. With the leading edge of each wing lying flush with the side wall of an associated boom, the structural characteristics of the folded wings are as sound and sturdy as a conventional truck.

For a better understanding of the invention as well as other objects and further features thereof, reference is had to the following detailed description to be read in connection with the accompanying drawings wherein like components are identified by like reference numerals:

In the drawing:

Fig. 4 shows a detail of the structure illustrated in Fig. 3, with one wing section in a partly open position.

Fig. 5 is a sectional view taken along lines 5—5 in Fig. 4.

Fig. 6 is a bottom plan view of the frame, showing the landing-gear arrangement.

Figure 1:
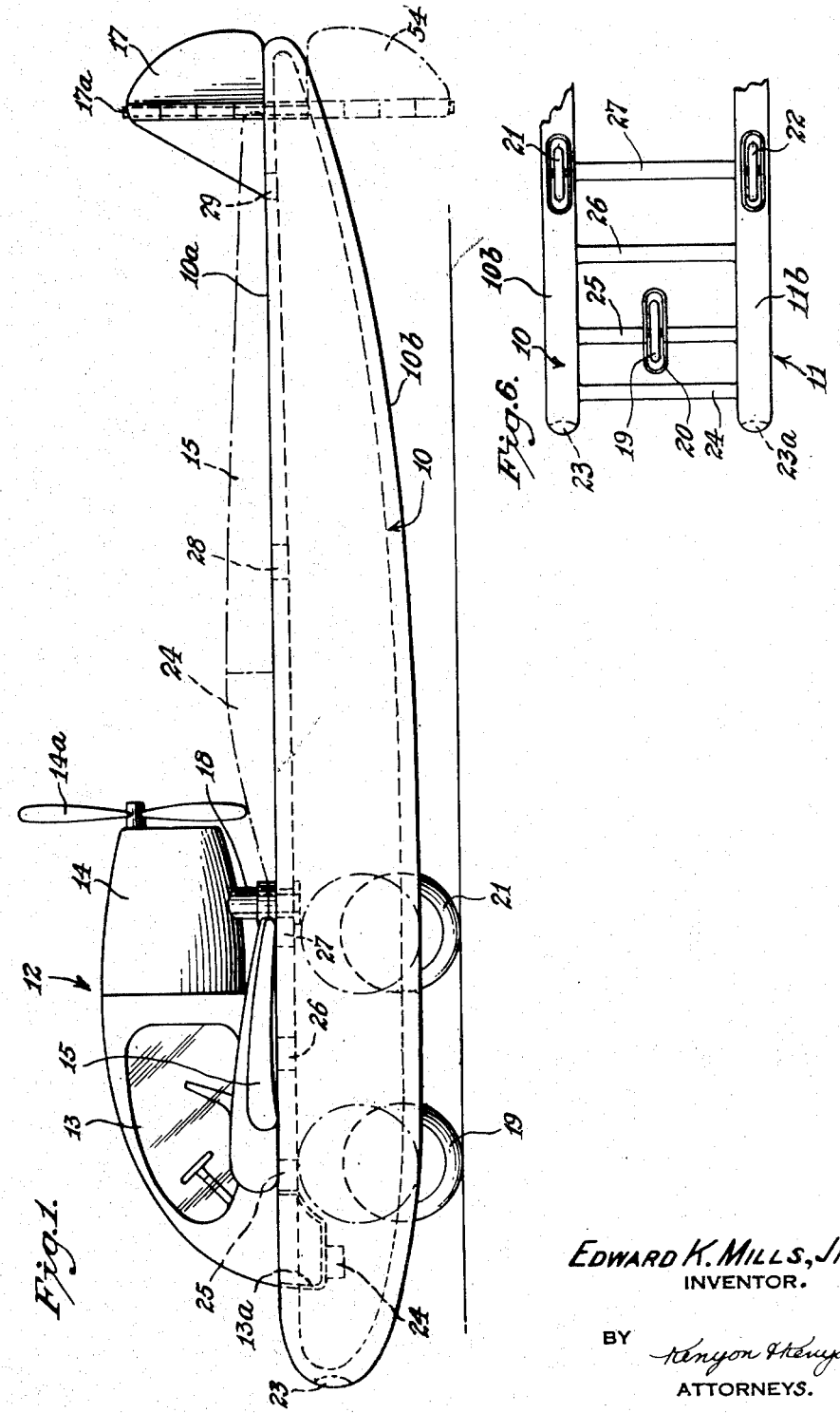
Fig. 1 is a side elevational view of a multi-purpose vehicle in accordance with the invention, showing by dash-lines selective positions of parts thereof.

Referring now to the drawing, a vehicle in accordance with the invention comprises twin booms 10 and 11, a fuselage 12 supported therebetween and provided with a forward pilot and passenger compartment 13, and a rear engine compartment 14 having the usual cowling, the engine serving to rotate a pusher-type propeller 14a. Compartment 13 is provided with a foot extension 13a which is disposed between the twin booms. Also provided is a pair of foldable wing sections 15 and 16, and a tail or rudder element 17, pivotally supported on a vertical rudder post 17a. Wing sections 15 and 16 are pivotally mounted on the longitudinal axis of the vehicle, the roots of the sections rotating about the vertical axis of a tubular hub member 18.

In the case of primary use of the vehicle on the ground as a car or light truck, the tricycle landing-gear arrangement of the vehicle is constituted by a single front wheel 19, rotatably supported in a suitable housing 20 mounted at an equi-distant forward position between the two booms, and a pair of wheels 21 and 22 rotatably supported and housed in the booms at corresponding positions. The wheels 19, 21 and 22, as indicated by the dash-lines, are retractable within their respective housings, this being accomplished by a conventional mechanism, such as a hydraulic system. Thus, during road operation of the vehicle, the wheels are fully extended. The wheels are also extended during take-off and when landing of the vehicle in flight operation, the wheels being retracted when the vehicle is aloft or water-borne.

At the front end of the booms are installed electric headlights 23 and 23a, respectively, which headlights are preferably inset in water-tight housings. The landing-gear arrangements may be steered and braked on a road or on an airport runway by a steering wheel and brakes of the usual type. In addition to the foot-brakes of a conventional aircraft for controlling each landing wheel separately, the vehicle is preferably provided with foot or hand brakes controlling both rear wheels 21 and 22 simultaneouslly, as in the case of conventional automobiles.

Booms 10 and 11 are of hollow, reinforced construction, the booms being formed with planar top walls 10a and 11a lying in the horizontal plane and with curved bottom walls 10b and 11b, the transverse dimension of the boom tapering toward the rear. The booms are rigidly inter-connected and supported in spaced parallel relation by hollow transverse supports or cross-pieces 24 to 29, each having a rectangular cross-section. As best seen in Fig. 1, the forward cross-piece 24 extends between the twin-booms 10 and 11 at corresponding points thereon approximately midway between the top and bottom walls thereof, to provide a support for the foot extension 13a of the passenger compartment, whereas the remaining cross-pieces lie with their upper surfaces flush with the top walls of the booms to constitute a supporting surface for the wing sections when folded together. Housing 20 for the front wheel 19 is firmly supported on cross-piece 25. Extending transverely between booms 10 and 11 at the rear ends thereof is an adjustable elevator 31, rudder 17 being perpendicularly mounted thereabove centrally between the booms.

Figure 2:
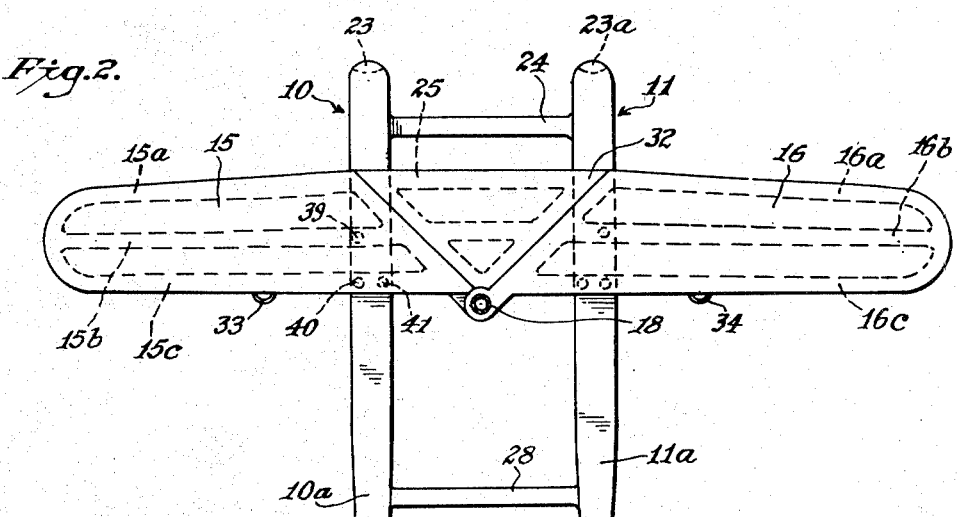
Fig. 2 is a plan view solely of the twin-boom frame structure of the vehicle in conjunction with the wings in the outstretched or flight position.

As best seen in Fig. 2 when the pivoted wing sections 15 and 16 are outstretched, the root edges of the wing sections abut the sloping edges of a fixed wing base section 32 which lies below fuselage 12, and extends between booms 10 and 11. Wing base 32 has an isosceles triangular shape whose apex terminates in hub 18, the base angle portions of the triangle being affixed to the booms to reinforce the frame. Thus, with wing sections 15 and 16 outstretched, the base section 32 is joined thereto to constitute a monoplane structure. As shown in dash-lines, each of the wing sections 15 and 16 is provided with longitudinally-extending reinforcing spars 15a, 15b and 15c and 16a, 16b and 16c, respectively, specially designed to house the locking mechanisms attaching wings to air-frame.

Figure 3:
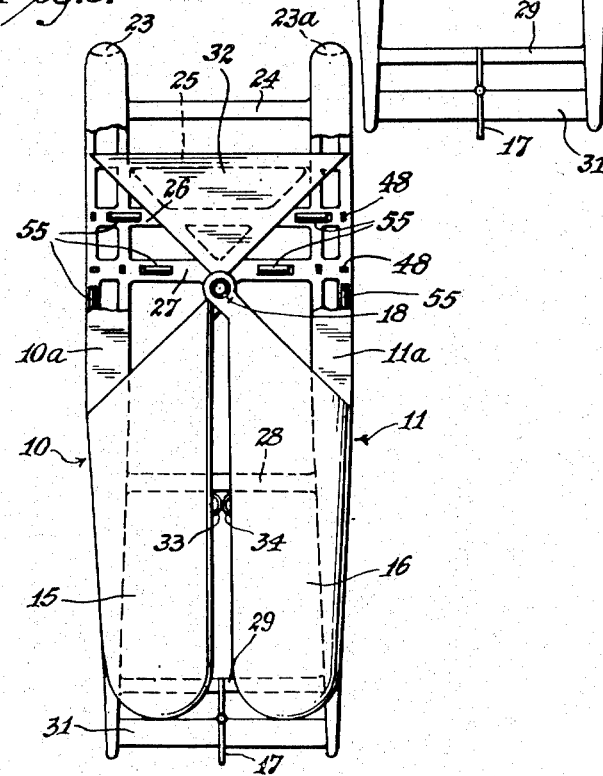
Fig. 3 is a plan view solely of the twin booms of the vehicle in conjunction with the wings in the folded position for land and sea operation.

As best evident in Fig. 3, when the wings are folded together, they extend tailward to the rear of elevators 31, the leading edges of wing sections 15 and 16 lying flush with the outer side walls of booms 10 and 11. The underside of wing sections 15 and 16 are flat and are solidly supported on the flat top walls of booms 10 and 11 as well as the flat top surface of cross-pieces 28 and 29. The trailing edges of wing sections 15 and 16 are provided with loop members 33 and 34 which may be locked together by suitable means to hold the wing sections in place. In the folded condition, the wing sections afford a deck for carrying a cargo, and by reason of their spar construction are capable of supporting a relatively heavy load.

Provision is made for automatically locking or releasing the wing sections in their outstretched position by means of locking mechanisms built into the specially designed spars 15b and 15c, and 16b and 16c. As shown in Figs. 4 and 5 in connection with wing section 15, such means include a pair of spaced plugs 35 and 36 which project from the root edge of the wing section and are received in suitable sockets 37 and 38, respectively, recessed in the edge of base section 32. Incorporated into the center and rear spars of each wing section are three identical pressure-operated sliding bolt mechanisms 39, 40 and 41, each mechanism including a cylindrical well 42, a piston 43 slidable therein, and a rectangular bolt element 44 coupled to the piston and movable therewith. The upper end of the well is enclosed by a disc 45 having an air-vent 46 therein, the disc being coupled by an expansion spring 47 to piston 43. Bolt 44 normally projects without the well through a slot in the bottom thereof, but by means of air pressure applied to piston 43 may be retracted into the well.

Spring 47 urges bolt 44 into a rectangular socket 48 embedded in the boom structure, which socket is in registration with the bolt opening in the well when the wing section is fully joined to the base section. To lock the wing section to the boom, an air-pressure operated cylinder 55 is provided having an actuatable pin 49 which projects laterally into socket 48 and passes through an orifice 50 in the bolt 44 to prevent withdrawal of the bolt. The operation of pin 49 is controlled by air-lines 51 and 52 connected to front and rear inlets in the cylinders 55 such that when air is forced into the cylinders through line 51, the pin 49 is withdrawn from bolt 44, whereas when air is forced into the cylinders through line 52, the pin is pushed into engagement with bolt 44, thereby locking the wing section. Air-lines 51 and 52 may be constituted by rigid pipes leading to a suitable air compressor, the valve controls for the air-lines being installed in the compartment 13. To prevent disengagement of pin 49 upon accidental failure of air pressure, cylinder 55 may be provided with externally controllable security means (not shown) to lock the pin 49 in place.

In order to fold back the wing section, it is necessary not only to withdraw the pin 49 from bolt 44 in each of the locking mechanisms; but it is further necessary to lift the bolt 44 from socket 48 to permit swing of the wing section. This is accomplished by a second air-pressure system having an air-line 53 leading to the bottom of well 42 at a lateral point below piston 43. Air fed into the well forces the piston 43 upwardly against the counter-pressure of spring 47 to raise therewith bolt 44, thereby permitting swinging movement of the wing section. Air-line 53 is partly constituted by a flexible tubing which passes through the bore of hub 18.

It is to be understood that the operation of the lock mechanism may alternatively be controlled by an electrical solenoid plunger system or by mechanical means.

In connection with the land and water use of the multi-purpose vehicle, any possible hazard from the revolving propeller blades may be obviated by the use of a removable heavy wire mesh guard encompassing the lower path of the blade. In populated areas, where the "prop wash" generated by the propeller might constitute a nuisance, a removable baffle device may be installed to funnel the air upwardly and away from both automobiles and pedestrians in the vicinity of the vehicle.

The steering control of the vehicle in water is effected by means of an auxiliary rudder 54 attached to the rudder post 17a whereby the conventional rudder steering controls also act to govern the position of the auxiliary rudder.

If it is desired to use the vehicle solely for land and air use, the twin booms may be relatively small and streamlined and need not be water-tight. Where, however, it is desired to use the vehicle for sea, as well as land and air use, the booms are enlarged and hermetically-sealed to form stabilizer pontoons. In this event, the vehicle operates as a hydroplane propelled by the pusher-type propeller. The deck formed by the folded wings is also suitable for carrying a cargo for water transportation. Should it be desired to render the vehicle amphibious whereby it is capable of a take-off and a landing on water, the booms may be further enlarged and designed to function as floats. The wing sections may also include air-tight chambers to augment the buoyancy of the vehicle.

While there has been disclosed what is considered to be a preferred embodiment of the invention, it is to be understood that many changes and modifications may be made therein without departing from the essential spirit of the invention. It is intended, therefore, in the appended claims to cover all such changes and modifications as fall within the true spirit of the invention.

What is claimed is:

1. A vehicle comprising a frame constituted by a pair of booms supported in spaced parallel relation, a fuselage mounted on said frame above said booms, and a pair of foldable wing sections pivotally mounted on a vertical axis intermediate said booms, said wing sections when folded together each resting on the top wall of a respective boom.

2. A vehicle comprising a frame constituted by a pair of booms and cross-pieces supporting said booms in spaced parallel relation, a fuselage mounted between said booms, and a pair of foldable wing sections pivotally mounted on a vertical axis intermediate said booms, said wing sections having a flat bottom wall, said booms having a planar horizontal top wall, said wing sections when folded together each resting on the top wall of a respective boom.

3. In a multi-purpose vehicle, a frame structure constituted by a pair of booms supported in spaced parallel relation, and a wing structure including a fixed triangular base section having a base portion extending between said booms and affixed thereto, a vertical hub mounted at the apex of said triangular base section, and a pair of foldable wing sections pivotally mounted on said hub, the inner edges of said wing sections abutting the edges of said base section when said wing sections are extended for flight operation, said booms having planar horizontal top walls, said wing sections having flat undersides adapted to rest on said top walls when said sections are folded in the tailward directions.

References Cited in the file of this patent

UNITED STATES PATENTS

| 1,716,439 | Gray _____ June 11, 1929 |
| 2,532,159 | Fulton _____ Nov. 28, 1950 |
| 2,573,854 | Lovejoy _____ Nov. 6, 1951 |

FOREIGN PATENTS

| 15,896 | France _____ July 27, 1912 |
| | (1st addition to Patent No. 443,539) |
| 108,970 | Australia _____ Nov. 16, 1939 |
| 256,743 | Great Britain _____ Aug. 19, 1926 |
| 418,776 | Great Britain _____ Oct. 31, 1934 |
| 484,622 | Great Britain _____ May 9, 1938 |